United States Patent [19]

Landrum, Jr.

[11] Patent Number: 4,567,583
[45] Date of Patent: Jan. 28, 1986

[54] ADAPTIVE PRESET FORCE LEVEL CONTROL FOR A SEISMIC VIBRATOR

[75] Inventor: Ralph A. Landrum, Jr., Houston, Tex.

[73] Assignee: Western Geophysical Company of America, Houston, Tex.

[21] Appl. No.: 535,215

[22] Filed: Sep. 23, 1983

[51] Int. Cl.$^4$ .............................................. G01V 1/14
[52] U.S. Cl. ..................... 367/190; 181/401; 181/107
[58] Field of Search .................. 367/45, 46, 23, 190, 367/189; 181/401, 106, 107; 364/421; 307/523, 359

[56] References Cited

U.S. PATENT DOCUMENTS

| | | | |
|---|---|---|---|
| 3,208,550 | 9/1965 | Castanet et al. | 181/5 |
| 3,895,343 | 7/1975 | Farr | 367/190 |
| 4,049,077 | 9/1977 | Mifsud . | |
| 4,051,473 | 9/1977 | Hooker | 307/359 |
| 4,068,210 | 1/1978 | Corkhill | 181/401 |
| 4,173,749 | 11/1979 | Corkhill | 367/190 |
| 4,184,144 | 1/1980 | Rickenbacker | 367/137 |

FOREIGN PATENT DOCUMENTS 2043896 10/1980 United Kingdom ................ 181/401

OTHER PUBLICATIONS

Werner et al., "Combisweep- . . . Sweep Techniques", 6/77, pp. 78–105, 39th Meeting of Europ. Assoc. of Explor. Geo., (Geophysical Prospecting), vol. 27.
Landrum, "Quality Control . . . Vibrators", 1976, pp. 1–22, 1976 Ann. Mtg. of SEG.

Primary Examiner—Nelson Moskowitz
Attorney, Agent, or Firm—William A. Knox

[57] ABSTRACT

A seismic vibrator for shaking the ground is driven by an input sweep signal. A control signal, which is a function of the output force level of the vibrator, modulates the sweep signal to limit the output force level to a value that will prevent ground decoupling. At the beginning of a sweep, an adaptive preset signal over-rides the control signal during a desired initial time portion of the sweep signal. The preset signal for a given sweep is derived from a sample of the control signal that existed during a specified portion of an immediately previous sweep.

5 Claims, 3 Drawing Figures

ADAPTIVE PRESET FORCE LEVEL CONTROL FOR A SEISMIC VIBRATOR

BACKGROUND OF THE INVENTION

1. Field of the Invention

This invention relates to a seismic vibrator for use in injecting swept-frequency acoustic signals into the earth. More particularly, the invention is concerned with automatically stabilizing the applied force level by means of an adaptive preset signal that is applied at the beginning of a sweep.

2. Discussion of the Prior Art

A seismic vibrator typically consists essentially of a ground-contacting base plate that is driven in reciprocal strokes by an electro-hydraulic servo-controlled linear actuator which acts against a free-floating inertia mass.

Customarily the vibrator mechanism is mounted on a heavy vehicle weighing on the order of 40,000 to 65,000 pounds. In operation, a portion of the mass of the truck is applied to the base plate, through a compliant means, as a static bias loading. That loading is required in order to couple the vibrator base plate to the ground. When the linear actuator is operated to cause the base plate to shake the ground, a certain force is developed. The applied force level is dependent upon the drive level of the system itself and upon the ground impedance, which varies considerably from place to place. If the force level exceeds the static bias loading, the base plate becomes decoupled from (jumps off) the ground, a most undesirable situation.

Manual adjustments may be made to the drive level. But such adjustments are necessarily empirical and may not be opitmal for all environments. Therefore, automatic feedback circuitry has been developed to minimize or eliminate unwanted base-plate decoupling.

One such system is taught by U.S. Pat. No. 4,184,144, issued Jan. 15, 1980 to Rickenbacker, which is incorporated herein by reference. Another patent of interest is U.S. Pat. No. 3,208,550 issued Sept. 28, 1965, to Castanet et al. In U.S. Pat. No. 4,184,144, the instantaneous force levels developed at the inertia mass and the base plate are measured, combined, and processed to generate a controlled signal that is the envelope of the peak level of the base plate ground force less the static force. That signal is fed back for the purpose of modulating the swept-frequency input drive signal as required, to prevent base-plate decoupling. More precisely the purpose is to maintain the controlled signal at some desired force level that is less than the static force.

The usual type of vibrator drive signal is a swept-frequency chirp signal having a frequency range of, perhaps, 10-125 Hz and having a finite time duration of four to eight or more seconds. For all practical purposes, the input sweep signal (or simply "sweep" for short) has a constant peak amplitude except for the beginning and ending portions of the sweep signal where the peak amplitudes are tapered up and tapered down respectively. The controlled signal is fed back to circuits that generate a control signal that then operates on the input drive signal so as to automatically maintain a force level beneath the base plate that is equal to or less than the static loading.

For the purposes of this disclosure, the term "vibrator" includes the vehicle, base plate, linear actuator etc., such that the individual parts need not necessarily be recited. The term "sweep generation" means the act of driving the vibrator base plate by the linear actuator in response to an input sweep signal, for the purpose of shaking the ground.

At the beginning of a sweep signal, the system has no history as to the correct initial drive level other than that provided by a gross manual drive-level setting. Hence during the initial portion of a sweep, the system tends to oscillate uncontrollably before stabilizing. Since with any servo loop, there is an inherent time lag between sensing of an overdrive condition and correction thereof, the initial portion of the sweep may occupy as much as a half-second or more. However during the first fraction of a second, the servo loop should act so as to drive the loop in the direction of stabilization.

Earlier, I pointed out that the ground impedance varies considerably from place to place. However between a series of stations that are not very far apart, such as 100-300 feet, the impedance change is usually gradual. Therefore it is reasonable to assume that the control-signal levels during sweeps at adjacent stations would be similar. Thus, a control-signal sample taken during or just after the end of the initial period of a prior sweep should approach the correct value so that it could be used as a preset control signal during the initial period of a subsequent sweep.

It is a purpose of this invention to superimpose an adaptive preset signal on a control-signal feedback circuit during the initial portion of a sweep.

SUMMARY OF THE INVENTION

In accordance with an aspect of this invention a vibrator occupies in succession a plurality of relatively closly-spaced survey stations and executes a sweep at each station. The force level developed beneath the base plate is computed to generate a controlled signal that is used to generate a control signal. The control signal modulates the drive level of a input sweep signal as a function of the developed force. At a selected instant following the initial portion of a sweep, the control-signal level is sampled and stored. The stored control-signal sample from a prior sweep will become a preset signal that is used in place of a computed control signal during the initial portion of a subsequent sweep.

In accordance with another aspect of this invention, a sample of the control signal from a prior sweep is applied to the input sweep signal of a subsequent sweep only during the initial portion of the sweep. Thereafter, during the operating portion of said subsequent sweep, the actual control signal as generated during that subsequent sweep is applied to the input-sweep drive signal.

BRIEF DESCRIPTION OF THE DRAWINGS

A better understanding of the benefits of this invention may be had by reference to the detailed description and the drawings wherein.

DETAILED DESCRIPTION OF A PREFERRED EMBODIMENT

Figure 2:
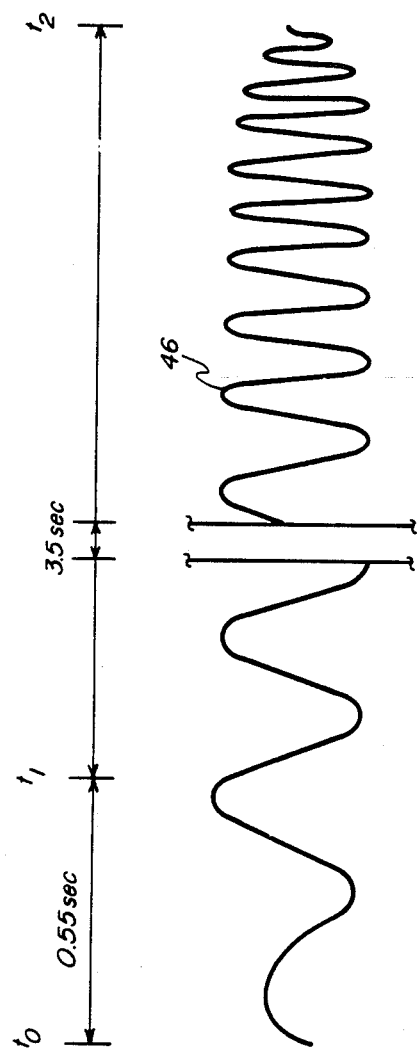
FIG. 2 is an example of a sinusoidal swept-frequency signal.
Figure 1:
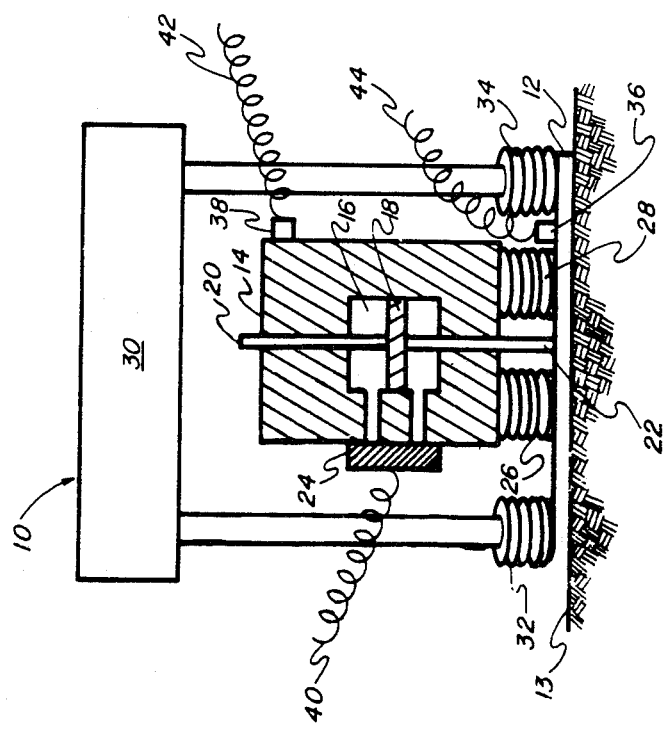
FIG. 1 is a schematic diagram of a vibrator system.

FIG. 1, adapted from U.S. Pat. No. 4,184,144, shows the essential parts of a seismic vibrator generally designated as 10. Vibrator 10 includes at least a base plate 12, an inertia mass 14 having an internal cylinder 16, within which reciprocably slides a piston 18, to which are secured shafts 20, 22. Lower shaft 22 is rigidly secured to base plate 12. An electrohydraulic servo-valve 24 admits fluid alternately to the top and bottom portions of cylinder 16 to reciprocate a mass 14 relative to base plate 12. Mass 14 is compliantly interconnected with base plate 12 by springs or air bags 26, 28. A static load 30, which may be a portion of the weight of a transport vehicle, is compliantly coupled to base plate 12 by springs or air bags 32, 34.

Accelerometers 36, 38 are secured to the base plate 12 and inertia mass 14 respectively in such a way as to register vertical acceleration. Servo valve 24 is driven by an input sweep signal delivered over lead 40. When operating, the accelerometer signals that will be used to compute the force level developed beneath the base plate, are transmitted to the control circuitry over leads 42 and 44.

FIG. 1 is a representation, 46, of an input sweep signal as generated by the sweep generator 48. The signal is a sinusoidal wave train of smoothly varying frequency ranging from, for example, 10 to 125 Hz over a sweep period of, say, four seconds. As shown, the input sweep signal includes an initial portion from $t_0$–$t_1$ of about 0.5 second or less and an operating portion from $t_1$ to $t_2$ of about 3.5 seconds or more. As will be seen later, the amplitude of the input sweep signal is modulated by a control signal whose level is related to the output force level as computed from the accelerations measured by accelerometers 36 and 38. The positive envelope of the input sweep signal 46, or for that matter of any other wave train, is a curve that smoothly connects the positive peaks of each wavelet.

Figure 3:
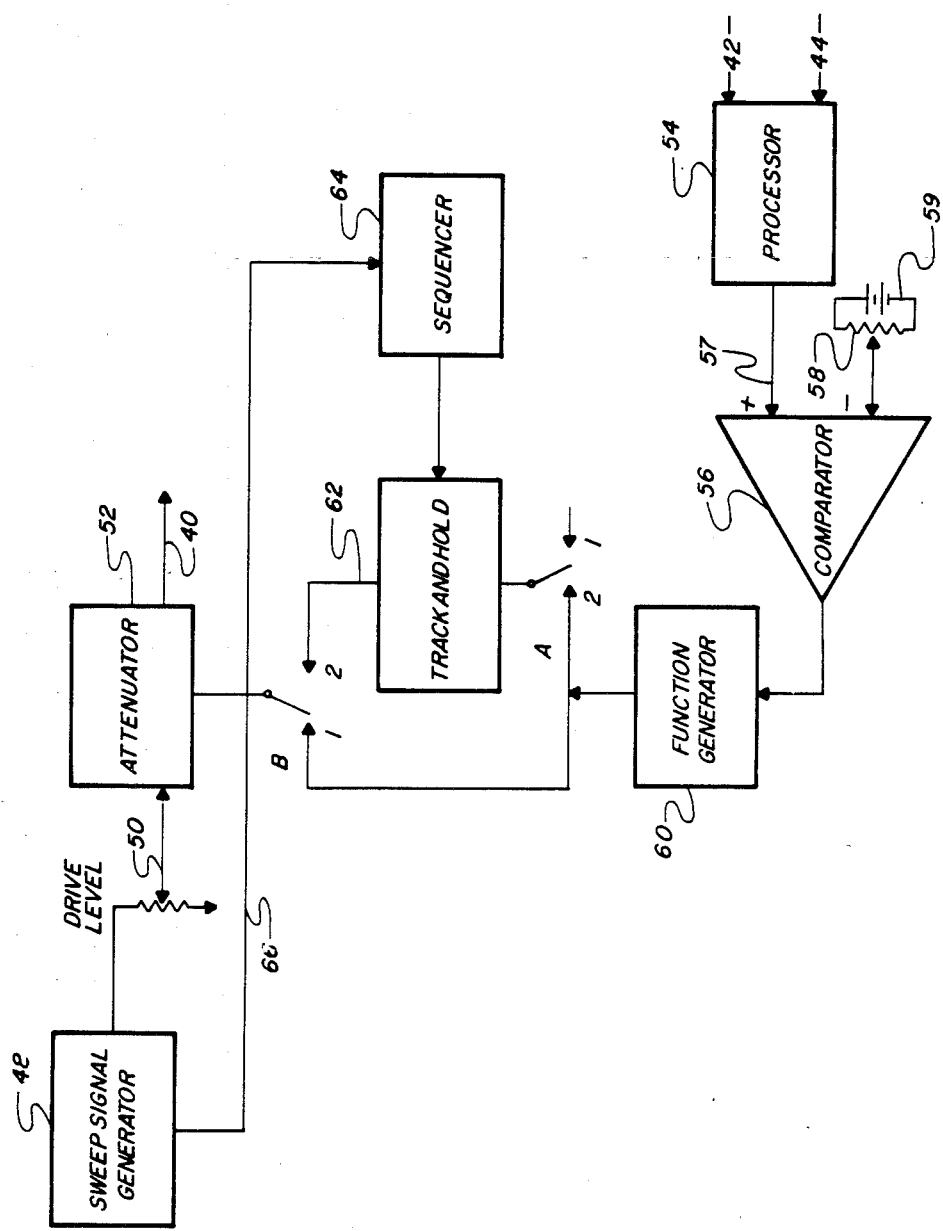
FIG. 3 shows the preset control circuitry of the invention.

An automatic input sweep signal level-control circuit is fully disclosed in U.S. Pat. No. 4,184,144. By way of review, the essential equivalent parts of the prior-art control-signal generating system are summarized in FIG. 3 of this disclosure. An input sweep signal is transmitted from sweep signal generator 48, through a manual level control 50, attenuator 52, to servo valve 24 over line 40. Feedback signals from accelerometers 36 and 38 are sent through leads 42, 44 to a processor 54 where those signals are combined. The output of processor 54 is a signal that is a function of the instantaneous envelope of the force delivered by base plate 12 into the earth 13 beneath the base plate. The force signal is transmitted to one side of a comparator 56 over lead 57. A desired force level is set by means of potentiometer 58 and voltage source 59 as a voltage level that becomes the other input to the comparator. The output of the comparator 56 controls function generator 60 whose output is a control signal, related to the output force level, for controlling attenuator 52.

Attenuator 52 modulates the level of the input sweep signal to a desired value relative to a reference to prevent base-plate decoupling.

The effectiveness of the automatic force-control system depends upon knowledge of the immediate past history of the force level actually applied to the earth that is necessary to inhibit decoupling. At the very beginning of the sweep, there is no such past history. Therefore, during the initial portion of the sweep the control-signal network must go through a learning phase before the system can stabilize itself. In fact, U.S. Pat. No. 4,184,114, uses the desired force level (an estimated manual setting) as a preset control signal which is more often than not, incorrect. I propose therefore to apply an adaptive preset signal to attenuator 52 during the initial portion of a sweep. The preset signal will be derived from a sample of the control signal of a previous sweep, taken during or shortly after the end of the initial portion of that sweep as the system is attempting to stabilize itself. By definition, the initial portion of a sweep is the period of time that is required for the system to stabilize after sweep-start time. In general I found that the time duration is a few tenths of a second up to about 0.5 second.

The preset circuit of my invention includes a track-and-hold circuit 62 of any well known type. Track-and-hold circuit 62 is interconnected with function generator 60 and attenuator 52 by switches A and B. Its operation and timing is controlled by sequencer 64.

In operation, at some appropriate time before start-of-sweep and while no sweep signal is present, sweep-signal generator 48 sends a command to sequencer 64 over line 66 to set switch B to position 2. Whatever signal level resides in track-and-hold circuit 62 from a previous sweep is applied to attenuator 52 as a preset control signal. The preset control signal will modulate the initial portion of the sweep signal level to the last known value that prevented base plate decoupling near the start of sweep.

After the driver sweep signal starts, sequencer 64 sets switch B to position 1 and switch A to position 2. The output of function generator 60 now modulates the sweep signal through attenuator 52 while track-and-hold circuit begins tracking the function-generator output. If a preset signal level is initially a little bit off from the correct value, the control loop will adaptively begin to correct itself and tend towards dynamic stabilization after a few sweeps as it accumulates a history of past performance.

Within a few tenths of a second (up to 0.5 second) sequencer 64 resets switch A to position 1. The track-and-hold circuit 62 then holds a sample of the control-signal level, as it existed at the time of A-switch reset, which will be used as a preset control signal for the next, subsequent sweep. Thus, the control-signal level that existed at the end of the initial portion of a previous sweep will become the preset control signal for a subsequent sweep.

It should be observed that mechanical switches, external to track-and-hold circuit 62, are shown for clarity. In practice, I prefer to use solid-state switches that are integral with track-and-hold circuit 62.

In general, it is contemplated that a plurality of sweeps are to be executed at assigned stations along a line of survey. The preset signal will therefore be adaptively and continuously updated, at least throughout a normal field-crew operating period. Of course, for the very first sweep of an operating period, no valid control-signal sample will be resident in track-and-hold circuit 62. However, a few practice sweeps at an initial location will soon provide a sufficient history to substantially stabilize system operation as desired.

I claim as my invention:

1. In a seismic vibrator for shaking the earth at a plurality of stations along a line of survey, the vibrator including at least an earth-contacting base plate that is reciprocably driven relative to an inertia mass by an electrohydraulic, servo-controlled linear actuator in response to an input sweep signal having a desired time duration, a method for adaptively modulating the level of selected portions of said input sweep signal, comprising:

(a) generating a control signal having a level that is a function of the force applied to the earth by said base plate;

(b) modulating the level of the input sweep signal by use of said control signal, during a first sweep;

(c) sampling the level of said control signal during a desired portion of said first sweep and storing said sample to define a preset signal;

(d) modulating the level of the input sweep signal of a subsequent sweep by the so-defined preset signal derived from the first sweep only during an initial portion of said subsequent sweep.

2. The method as defined by claim 1, comprising:
repeating steps (a) through (d) for a plurality of sweeps and during a desired portion of a prior sweep, sampling the control signal of each prior sweep to define a preset signal for modulating the level of a next subsequent sweep signal only during the initial portion of each said subsequent sweep.

3. In a seismic vibrator including a linear actuator secured to a ground-contacting baseplate the linear actuator being driven by an input sweep signal, said sweep signal including an initial portion and an operating portion, means for generating a control signal whose level is a function of the force applied to the ground by said ground-contacting baseplate, means for modulating the level of said input sweep signal by said control signal, the improvement comprising:

means for selecting a sample of the level of the control signal existing during a preselected portion of a first input sweep to derive a preset control signal; and means for modulating the level of a subsequent input sweep signal only during an initial portion thereof, by the preset control signal derived from said first input sweep.

4. The apparatus as defined in claim 3, further comprising:

means for modulating the level of the input sweep signal during the operating portion of said subsequent sweep by the control signal generated during said subsequent sweep.

5. The apparatus as defined in claim 3, wherein said preset signal sampling means comprises:

a track-and-hold circuit having an input and an output;

a first switching means for interconnecting the output of said track-and-hold circuit with said sweep-signal modulating means;

a second switching means for tracking and storing a sample of the control-signal level near the end of the initial portion of a sweep;

a sequencer, interconnected between said input sweep-signal generator and said first and second switching means for actuating said switches in a desired timed sequence relative to the start-of-sweep time of said input sweep signal generator.

* * * * *